B. C. STICKNEY.
COMBINED TYPE WRITING AND COMPUTING MACHINE.
APPLICATION FILED SEPT. 27, 1913.

1,186,521.

Patented June 6, 1916.
6 SHEETS—SHEET 1.

WITNESSES:
Julius Duckstine
L. Bittiger.

INVENTOR:
Burnham C Stickney

B. C. STICKNEY.
COMBINED TYPE WRITING AND COMPUTING MACHINE.
APPLICATION FILED SEPT. 27, 1913.

1,186,521.

Patented June 6, 1916.
6 SHEETS—SHEET 3.

FIG.5.

WITNESSES:

INVENTOR:
Burnham C Stickney

B. C. STICKNEY.
COMBINED TYPE WRITING AND COMPUTING MACHINE.
APPLICATION FILED SEPT. 27, 1913.

1,186,521.

Patented June 6, 1916.
6 SHEETS—SHEET 4.

WITNESSES:
Julius Duckstine
L. Bittiger.

INVENTOR:
Burnham C Stickney

B. C. STICKNEY.
COMBINED TYPE WRITING AND COMPUTING MACHINE.
APPLICATION FILED SEPT. 27, 1913.

1,186,521.

Patented June 6, 1916.
6 SHEETS—SHEET 6.

WITNESSES:

INVENTOR:

UNITED STATES PATENT OFFICE.

BURNHAM C. STICKNEY, OF ELIZABETH, NEW JERSEY, ASSIGNOR, BY MESNE ASSIGN-
MENTS, TO UNDERWOOD COMPUTING MACHINE COMPANY, OF NEW YORK, N. Y., A
CORPORATION OF NEW YORK.

COMBINED TYPE-WRITING AND COMPUTING MACHINE.

1,186,521.           Specification of Letters Patent.      Patented June 6, 1916.

Application filed September 27, 1913. Serial No. 792,070.

*To all whom it may concern:*

Be it known that I, BURNHAM C. STICK-
NEY, a citizen of the United States, residing
in Elizabeth, in the county of Union and
State of New Jersey, have invented certain
new and useful Improvements in Combined
Type-Writing and Computing Machines, of
which the following is a specification.

This invention relates to computing machines of the kind in which the numeral keys
set up indexing devices, which subsequently
control the extent to which the number
wheels or parts of a register or totalizer are
turned by a general operator.

The principal object of the invention is to
provide improved means for effecting the
operation of a plurality of registers.

In carrying out the present invention, any
suitable registering mechanism of this class
may be taken as a basis for a single register;
and one or more additional registers may be
operatively connected to the first register to
be driven simultaneously therewith; where-
by a single set of indexing devices may serve
to control the extent of operation of sev-
eral registers or totalizers.

This invention is of importance not only
with simple computing machines, but also in
connection with machines in which a typewriting mechanism is combined with a com-
puting mechanism. The carriage of the
typewriter is usually employed for selecting
the denominations, while the keys select the
digits of the indexing mechanism; and by
means of a simple device, a single setting of
the index devices answers for two or more
registers. This greatly simplifies the con-
nections between the adding mechanism and
the typewriter carriage, where several registers are employed.

The wheels usually comprising a register
in an Underwood-Hanson machine are usu-
ally driven by means of bars which are ad-
vanced by means of a general operator; said bars having racks to engage pinions on the
number wheels. Said bars also carry index
pins, and are also arranged to be displaced
one by one by means of connections on the
typewriter carriage at the index-setting op-
eration.

According to the present improvements,
the additional register or registers are pro-
vided with dead driving bars, that is, these
additional driving bars do not carry any in-
dexing devices, and are not connected to the
typewriter carriage. Instead, they are con-
nected by means of cross connections to the
wheel driving bars of the usual register,
which is herein termed for convenience, the
main or major register.

Each of the main register driving bars
has an additional rack, which is connected
by a train of gearing with the correspond-
ing bar on each of the other registers; said
train of gearing preferably comprising two
pinions and a shaft on which they are
mounted; one pinion meshing with the rack
on the main driving bar, and the other mesh-
ing with the corresponding rack on the
driven bar. These racks are conveniently
placed in a row, one behind the other, the
pinions being arranged in echelon, thus pro-
ducing a convenient, compact, and easily
constructed mechanism.

Another important feature of the invention consists of the provision of means
whereby one of the registers may either add
or subtract while another register is adding;
and preferably each register is provided
with a shiftable device so that it may be
either adding or subtracting or silenced,
while each of the remaining registers is
either adding, subtracting or silenced, and
will be more fully explained hereinafter.
Thus the machine, by means of a simple
mechanism, is adapted to perform a great
range of tabulating or calculating opera-
tions by the use of only a single denomina-
tion-selecting mechanism.

It will be understood that by the use of
only one denomination-selecting dog on the
typewriter carriage, the numbers written in
a single column down the page may be con-
comitantly added or subtracted on each of
two or more registers; and it may be further
understood that by the employment of an additional dog or dogs on the typewriter carriage for successively operating the denomination-selecting devices, the numbers written in the second, third and other columns on the same work-sheet may be also carried into one or more of the registers as required, thus permitting a variety of cross computation, and otherwise increasing the capacity of the machine.

Other objects and advantages will hereinafter appear.

In the accompanying drawings.

Numeral keys 1 and alphabet keys 2 operate levers 3, 4, to vibrate type-bars 5 upwardly, to strike against the front side of a platen 6 mounted on a carriage 7 which travels on a rail 8, and is controlled by a rack 9 meshing with a pinion 10 connected to an escapement wheel 11. Each type-bar has a heel 12 to engage a universal bar 13 mounted on a frame 14 which operates a rocker 15 having vibratory dogs 16, 17, to engage said escapement wheel and permit the carriage to feed step-by-step under the impulse of the usual spring barrel $17^a$, Fig. 3.

The computing mechanism includes an index mechanism which is operable by the numeral keys; each key having a pendent rod 18 to engage and depress the corresponding one of a series of rock arms 19, which are arrayed across the machine, being mounted upon the forward ends of rearwardly extending horizontal rock shafts 20, forming parts of linkages which depress the index pins. Each rock shaft carries an upstanding arm 21 to engage a wrist or pin 22 upon a horizontal link 23, which extends from side to side of the machine. At its ends, each link connects a pair of bell cranks 24, the long arms 25 of which are connected by links 26 which descend to press down index pins 27. Each numeral key thus determines the value of the index pin which is depressed or selected, but the typewriter carriage 7 determines the denomination of the depressed pin; each link or depressor bar 26 being capable of depressing one pin in each denomination.

The index pins are arranged in rows upon bars 28, extending forwardly and rearwardly beneath the links 26, and serving eventually to rotate the number wheels in a manner presently to be described.

Figures 8, 9:
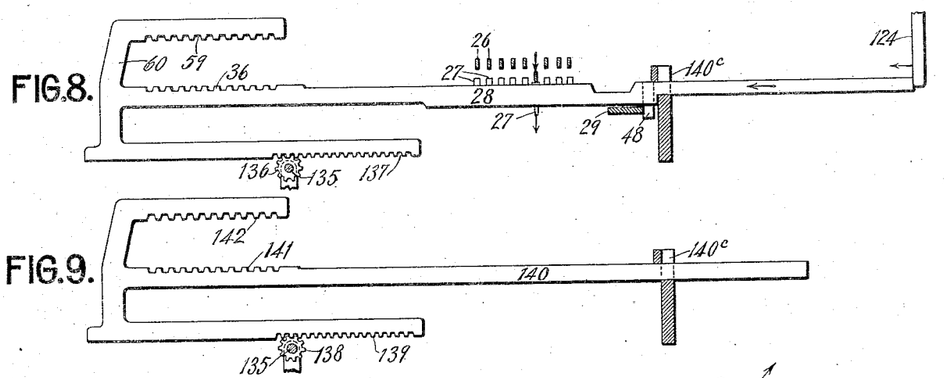
Fig. 8 is a side elevation of one of the bars which operate the major register, this bar carrying a series of index pins and also having addition and subtraction racks, and further provided with a rack for driving the corresponding bar in one or more other registers.
Fig. 9 is a view of a rack such as used for driving the sub-registers; said bar not having any indexing devices or any denominational selecting devices, but having a rack which is driven from the bar seen at Fig. 8.

Normally the index pins are out of the path of movement of the depressor bars 26, but as the paper carriage 7 feeds step-by-step, the bars 28 are displaced forwardly one after another, to positions to bring their pins within range of the depressor bars 26 (see Fig. 8), so that any bar 26 may depress the corresponding pin of the forwardly displaced pin bar. Any suitable means may be employed for displacing the pin bars forwardly one after another during the movement of the paper carriage; but there is shown herein, for the sake of illustration, a mechanism for this purpose which will presently be referred to. Such index pins as are depressed, project below the bars 28 on which they are carried, and serve as lugs whereby said bars may be driven endwise forwardly for turning the number wheels. They are driven by means of a universal driver in the form of a transverse horizontal bar 29 which forms part of a general operator which is operated once for every calculation.

The general operator in the Underwood-Hanson combined adding and typewriting machine comprises side bars 30 (Fig. 4) which are slid in guides on the side walls of the framework and are rigidly united to form a slide or carriage; said cross bar 29 forming one of the devices for tying said bars 30 together. This carriage or general operator may be driven by a crank 31 which is fixed upon a transverse horizontal rock shaft 32, journaled at its ends in the framework of the machine, and carrying at its ends segments 33 which mesh with idle pinions 34, the latter meshing with racks 35 formed upon said general operator side bars 30. A movement of the crank 31 forwardly from the Fig. 3 position causes the general operator to drive forwardly, and the bar 29 thereon engages any depressed index pins 27, and drives forward the bars 28 on which they are mounted. At its forward end each of said index pin bars 28 carries an addition rack 36 normally out of mesh with a pinion 37, which is fixed to a number wheel 38 forming one of a gang, there being one pin bar 28 for each number wheel in said gang. These number wheels are arranged below a sight opening 39 in the casing of the machine.

The cross bar 29, which engages the depressed index pins, is placed some distance behind said pins, so as to permit considerable lost motion of the general operator before the first pin can be engaged by said cross bar, and during this lost motion, the racks 36 become meshed with the number wheel pinions 37. This result is effected in the following manner: Carried upon power shaft 32 and rotated thereby is a disk 40 having a cam 67 which, as soon as the crank 31 starts to turn, engages a rider or pawl 41 pivoted at 42 upon an arm 43 of a lever 45, which is fixed to and turns upon a transverse horizontal rock-shaft 44, and swings said lever from the normal position seen at Fig. 3 to the position seen at Fig. 7, so that forwardly extending arm 45ª of said lever 45 may pull down, by means of a link 46, a framework which carries said number wheels on an arbor 49, thus bringing the pinions 37 into mesh with said adding racks 36. Hence as the general operator continues to drive forward under the impulse of the crank 31, the pinions are turned clockwise at Fig. 7, and the number wheels are turned in the same forward direction, thus performing addition; each number wheel being advanced to an extent dependent upon which of its index pins 27 was depressed.

After the crank 31 has been given a full forward stroke, it is swung backwardly to normal position to restore the general operator to its normal position. At the initial portion of the return stroke of the crank 31 and its shaft 32, the rider or pawl 41 turns counter-clockwise at Fig. 7 (the cam 40 now turning in the reverse direction from that indicated by the arrow at said figure), and by a very slight rotation of said pivot 42, said pawl is rendered no longer capable of supporting the arm 43. This permits springs 47 to draw rearwardly V-shaped or double cam levers or arms 47ª pivoted at 47ᵇ, which engage the ends of said arbor 49 and thereby raise said wheels clear of the rack bars 36, so that the parts 43 and 45 are restored to their normal positions. This movement, which withdraws the pinions 37 from the addition racks 36, takes place before the racks themselves start upon their return or rearward movement to normal position; such return being preferably effected by the same cross bar 29 which previously carried the racks forward. The cross bar, for this purpose, engages lugs 48 pendent from the rack bars in the rear of the cross bar 29, but is arranged to have considerable idle rearward motion (enough to permit collapse of pawl 41) before engaging said lugs 48.

The arbor 49 on which the number wheels 38 and their pinions 37 are mounted, forms a tie-rod connecting the two sides 50 and 51 of a swinging frame, which has bearings or sockets at 52 to swing upon collars 53 carried by a transverse horizontal shaft 64; this shaft forming a convenient hinged support for said frame 50, 51, and keeping the computing wheels always in proper relationship to the shaft 54, which is connected to the general operator and carries certain prime moving tens-carrying devices, as will presently be explained. The side members 50, 51 are also connected by a tie-rod 55. The arm 45ª of the shifting lever may be duplicated at 56, and the link 46 may be duplicated at 57; the shaft 44 forming a rigid connection between 45ª and 56, so that the links 46, 57, pull down both sides of the number wheel shifting frame 50, 51. The links 46, 57 may be pivoted at 58 to arms 45ª, 56. Upon each of said index pin bars 28 is carried not only an addition rack 36, but also a subtraction rack 59, which is idle, as at Fig. 7, during the addition operation. This rack is parallel with the addition rack 36, but above the pinion 37; and is connected by an arm 60 with the forward end of the bar 28.

To cause the wheels 38 to subtract at the driving strokes of the index bars 28, it is only necessary to move the computation pinions 37 into mesh with the subtraction racks 59, instead of the addition racks 36, so that the number wheels will be turned backwardly at the ensuing forward drive of the index bars 28.

Figures 1, 2, 3:
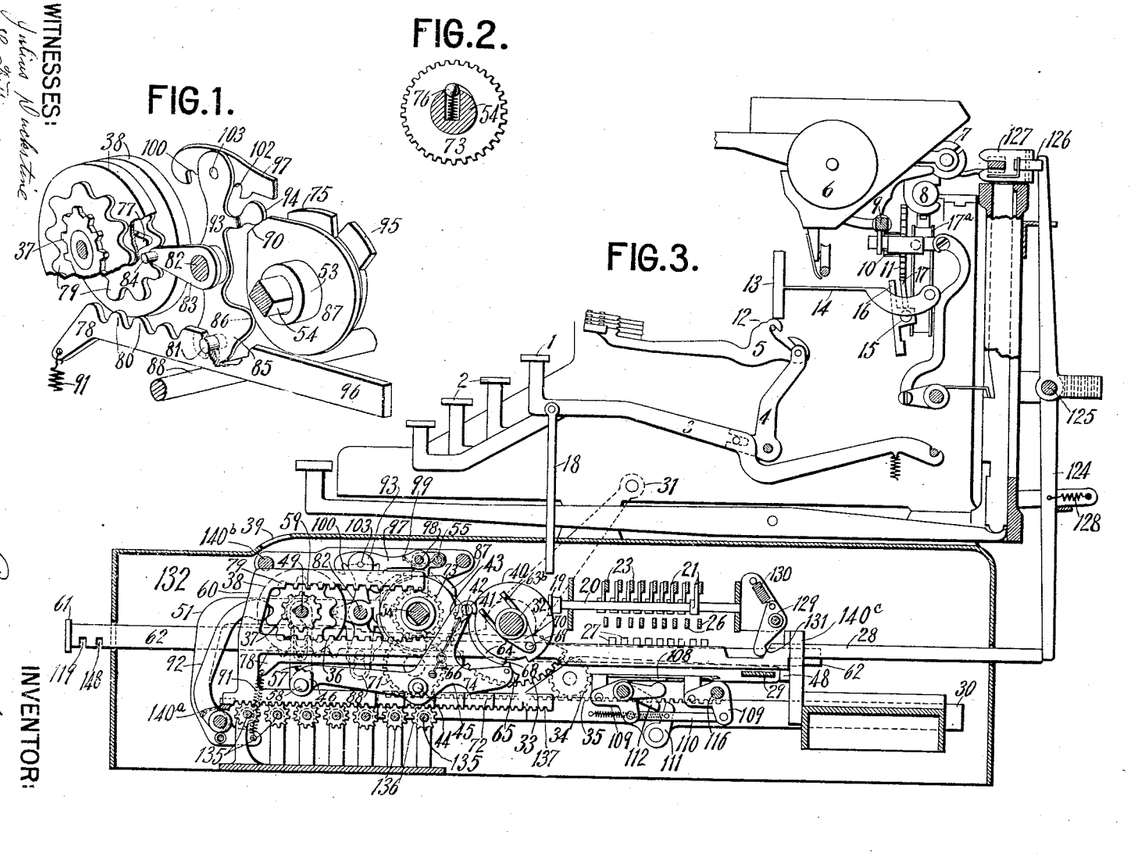
Figure 1 is a perspective view of one variety of tens-carrying mechanism which may be used in connection with the present improvements.
Fig. 2 is a sectional view of a clutch device.
Fig. 3 is a sectional elevation of a combined adding and typewriting machine of the Underwood-Hanson type, showing the present improvements embodied therein.
Figure 13:
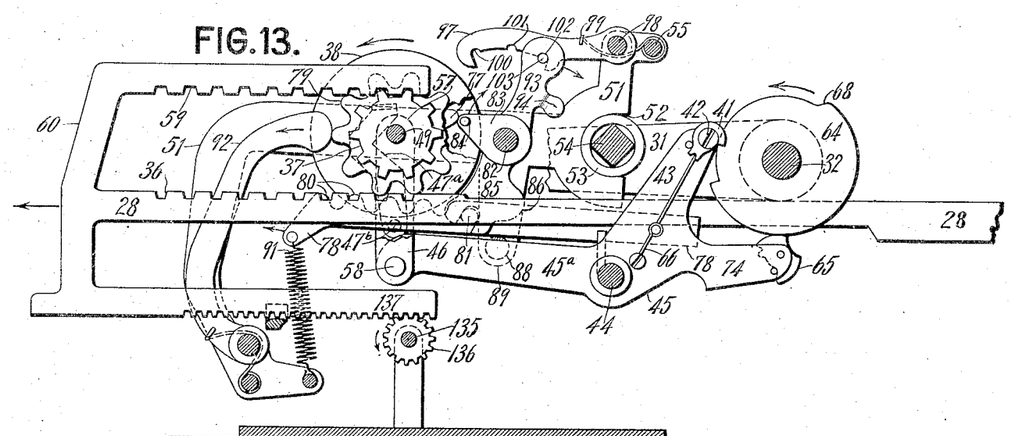
Fig. 13 is a view similar to Fig. 12, but illustrating the subtraction operation.
Figure 14:
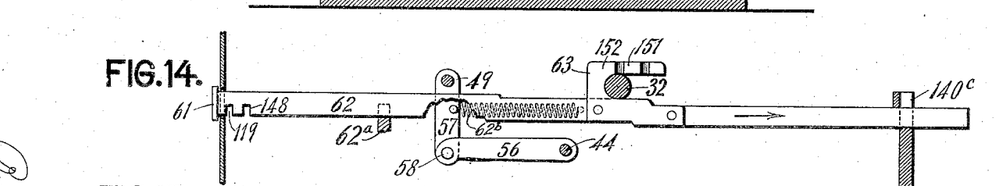
Fig. 14 is a sectional side elevation to illustrate a subtracting key in its rearmost or subtracting position.

When the operator desires that the wheels 38 shall perform subtraction, he presses rearwardly a subtraction key 61 on the forward end of a rod or bar 62, (having a returning spring 62ᵇ) which extends from front to rear of the machine, and slides on a rest 62ª. Between its ends, this rod carries a cam 63, which during the backward thrust of the rod, engages the end of a sleeve 63ª (having a returning spring 63ᵇ), and forces the same endwise along the shaft 32 together with the cam disk 40, which is fast to said sleeve 63ª, thus displacing the latter and silencing the pawl 41. At the same time is brought into play a second disk 64 having a cam 68 also fast to said sleeve, which disk is effective only for the purpose of subtraction. This disk 64 is arranged to coöperate with a follower or pawl 65, which is out of line with the pawl 41, that is, it works in a different plane; the disk 64 being shifted into the same plane as its pawl 65 when the cam disk 40 is shifted out of engagement with th pawl 41. During the ensuing forward stroke of the general operator, the cam disk 40 will rotate idly; but the cam disk 64, as seen at Fig. 3, will engage the follower or pawl 65, and thrust down the arm 74 of the lever 45 from normal midway position to the depressed position as seen at Fig. 13, thus drawing upwardly the links 46 and 57, thereby lifting the frame 50, 51, and carrying the pinions 37 into mesh with the subtraction racks 59, so that the latter are enabled to turn the number wheels backwardly during the remainder of the forward stroke of the general operator. On the return stroke, the pawl 65 releases the arm 74, and then the cam arms 47ª draw the pinions 37 clear of the racks 59.

The pawls 41 and 65 are provided with springs 66 which restore the pawls to normal positions at the end of the return stroke of the general operator. Normally springs 47 and arms 47ª, Figs. 3, 11, hold the lever 45 in its midway position, and the pawls 41 and 65 stand ready for engagement with their respective cams 67 and 68, as at Figs. 3, 7. These cam disks 40, 64, are splined to to the shaft 32 by means of a pin 69 carried on an arm 70 fixed to said shaft, and passing through a hole in disk 40.

The carry-over devices comprise an idle pinion 71, meshing with a rack 72 on the general operator, to connect said operator with a pinion 73 on the horizontal transverse shaft 54 having a helical series of cams or tappets 75 for carrying tens at the addition operation. This shaft 54 turns in only one direction, and is operated only during the return stroke of the general operator; being for this purpose connected by a ball clutch mechanism 76 to the pinion 73, as seen at Fig. 2. A spring 131ª holds a detent 132ª, Fig. 4, to prevent backward rotation of the shaft 54.

Each number wheel (except that of lowest denomination) has an individual train of mechanism for connecting it to this power-driven tens-carrying shaft 54, but the train is normally broken, and hence the tappets or cams 75 are all normally ineffective. Each number wheel 38 (except that of highest denomination) has a starting tooth 77, the function of which is to establish a connection from the number wheel of next higher denomination to the tens-carrying shaft 54.

Each of the trains of connecting devices includes a pawl 78 to mesh with a gear 79 fixed upon the number wheel, the pawl having multiple teeth 80, or being in the form of a short rack or pawl 78, as shown. Each rack is normally out of mesh with its gear wheel 79, but the general operator operates means to shift it up into mesh with its gear, and the starting tooth 77 operates means also to provide for its subsequent driving movement.

To this end, the pawl 78 has a pin-and-slot connection at 81 with a two-armed lever or tumbler between the power-driven tens-carrying cams 75 and the number wheel rotating pawl 78; this lever being pivoted between its ends upon an arbor 82, and having a short arm 83 provided with a pin 84 in the path of said starting or setting tooth 77.

Figures 7, 16:
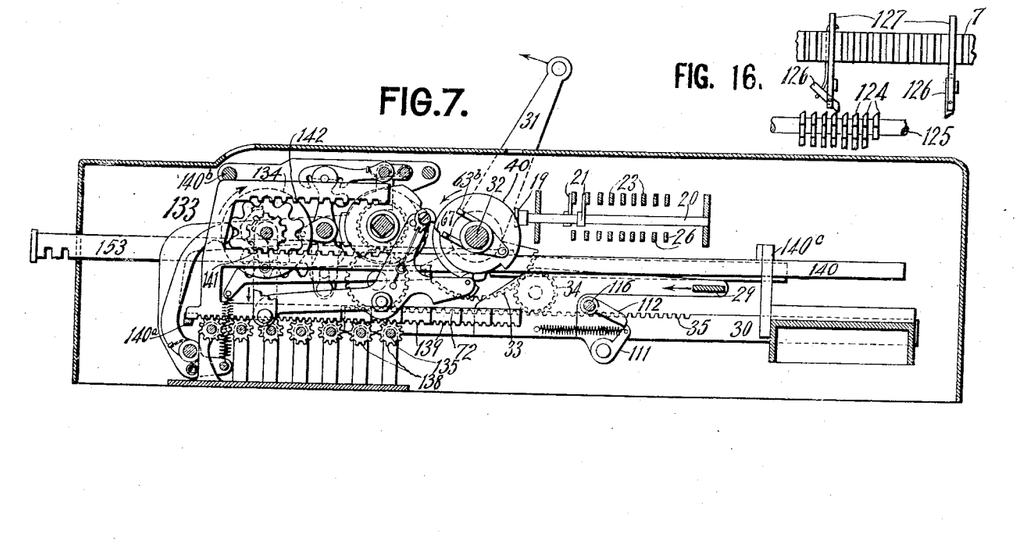
Fig. 7 is a sectional side elevation of the left-hand register and its appurtenances and connections; this section being taken at about the line $x-x$ of Fig. 4.
Fig. 16 shows two dogs 126, 127 on the carriage for coming into use successively during the run of the carriage for operating the denomination selecting jacks or lever 124.

The number wheel 38 turns in the direction of the arrow, or clockwise, as at Fig. 7, to perform addition. The setting tooth 77, at the completion of a full revolution of said number wheel 38, engages and depresses the pin 84 together with the arm 83, swinging said lever, rocker or interponent. The lower arm 85 of said lever or rocker has a slot to engage with the pin 81 on the tens-carrying pawl 78, which by the movement of the rocker, is drawn back from the normal position at Fig. 7. Upon said arm 85 is a cam-like tooth 86, which is swung into the path of the associated tappet 75 on the tens-carrying shaft 54, the function of the latter being to act upon said tooth 86, and thereby return the rocker forward to its normal position. During such return movement, the rocker arm 85 carries with it the pawl 78, which, however, has in the meantime been swung up into mesh with the gear 79 of the number wheel next higher than that which carries the setting tooth 77, whose movement has just been mentioned.

Figure 12:
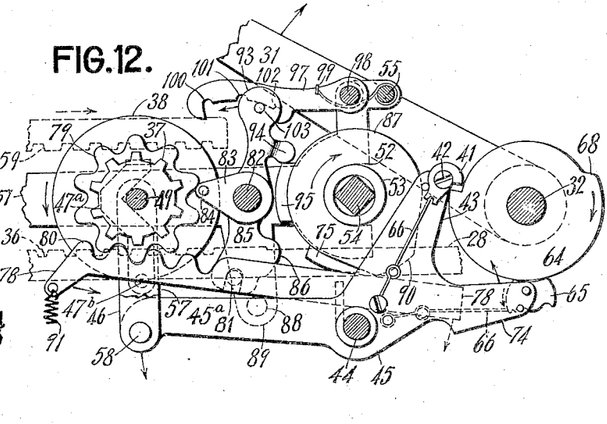
Fig. 12 is a view of the parts as seen at Fig. 7, but illustrating the tens-carrying operation.

The forward swing of the pawl 78 is effected by the engagement of the tappet 75 with the rocker tooth 86, there being provided upon the tens-carrying shaft 54 a cam 87 which depresses the rear end 96 of the pawl 78, and lifts the forward end thereof into mesh with said gear 79 as at Fig. 12; the pawl being supported between its ends by a rod 88 which rigidly connects arms 89 pendent from the side plates 50, 51, thus forming part of the frame which carries the arbor 49 and which extends forwardly from the collars 53 on said shaft 54, to rock up and down for shifting the adding pinions into and out of mesh with the driving racks 36. By means of said pawl 78, the higher number wheel is advanced one point. The cam 87 has a continuation or dwell portion 90 which holds down the rear end 96 of the pawl 78 during the wheel driving movement, and which thereupon releases said pawl and permits the forward end thereof to be snapped down by a spring 91 out of mesh with the gear 79; a spring detent 92 engaging the latter to hold the number wheel in position.

At the subtracting operation, which includes what may be called tens-borrowing, the setting tooth 77 on the number wheel, which is traveling counter-clockwise (Fig. 13), lifts the arm 83 and swings the rocker to the Fig. 13 position.

The upper arm 93 of the rocker has a tooth 94 which is swung into the path of a cam or tappet 95 on the power shaft 54; the tappets 95 being spirally arranged and being paired with the tappets 75. The tappets 95 are in different planes from the tappets 75, and the tooth 94 is correspondingly offset from the arm 93. The cam 87 depresses the rear arm 96 of the pawl 78 and elevates the front arm thereof into mesh with the gear 79, and then the tappet 95 camming or acting upon the tooth 94, swings the rocker 93, 85 to the normal midway position at Fig. 12; thus drawing backwardly the pawl 78. At the conclusion of the tens-borrowing operation, the cam 87 releases the rear arm 96 of the pawl, and the forward arm of the latter is drawn down by the spring 91 as before.

Figure 15:
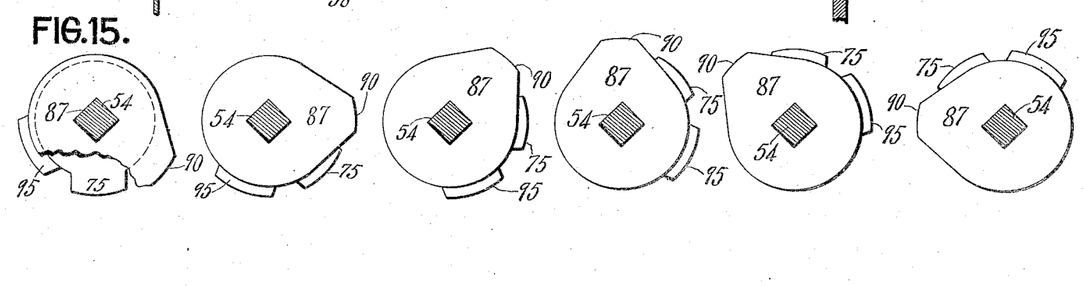
Fig. 15 shows a series of cams used in the tens-carrying operation in that style of register shown in the other drawings; but it will be understood that the present improvements may be applied to different kinds of registers.

Each cam 87, together with its associated tappets 75 and 95, forms a group, and said groups, as seen at Fig. 15, are arranged spirally on the shaft 54, so that the computing wheels are successively operated by the carry-over devices, from lower to higher denominations.

The rocker or tumbler 85, 93, is held in any of its three positions by means of a catch 97 pivoted upon a rod 98, which rod connects the side plates 50, 51, just in front of the rod 55, and said catch is pressed downwardly by a spring 99 coiled around the rod 55; the catch having three notches 100, 101 and 102 to engage a pin 103 on the tumbler to hold the same in any of three positions.

All of the tens-carrying trains are mounted upon the swinging frame 50, 51, and the number wheels with their pinions, detents 92, gears, and tens-carrying trains, swing up and down as a unit about said power shaft 54, which serves as a support for the rear end of said frame, as already explained. The raising of the universal plate 108 restores the index pins 27 to normal positions. The plate 108 is operated in the usual manner, and is pivoted as usual upon bell cranks 109 loosely mounted on rock shafts (116) and connected by a link 110.

During the last part of the return stroke of the general operator, a pawl or abutment 111 on a side bar 30 usually engages an arm 112 secured to one of the rock shafts 116 to cause the latter to rock, and the plate 108 to rise, thereby lifting the index pins 27. Thereupon the arm 112 trips off from the abutment 111 and the plate 108 drops.

If it be desired to retain the key 61 in its rearward position, a bolt 117 may be slid to the left by means of a finger-piece 118 to engage a notch 119 in the rod 62; a spring detent 120 holding the bolt in either position. The means for setting said index pin bars 28 forwardly so as to bring the index pins 27 into register with the pin-depressing linkages 26, may be of any suitable construction, and may comprise vertical levers 124 pivoted between their ends at 125, the lower ends of these levers being adapted to strike the rear ends of the index pin bars 28. At their upper ends, these levers are engageable by bevel dogs 126 pivoted upon lugs 127 on the carriage 7; the levers being arranged at letter-space intervals, so that at each letter-feeding movement of the carriage 7, one of the levers 124 is vibrated, and the index pin bar 28 of corresponding denomination is set forwardly, so as to bring its pins within range of the depressors 26.

The levers 124 are so formed that the denominational order of their upper ends is the inverse of their lower ends. The dogs 126 are individually pivoted so as to permit them to ride idly over the ends of the levers 124 while the carriage is being returned. Returning springs 128 are provided for the levers 124, and pivoted fingers 129 are pressed by springs 130 against shoulders 131 on the index pin bars 28, to return them one after another from the positions to which they are displaced by the levers 124; said fingers 129 riding idly on the top edges of said index pin bars 28 during the wheel driving movements of the latter.

Reference is made to United States Hanson Patent No. 905,421 of December 1, 1908, for further explanation of the operation of machines of this general class.

Figure 4:
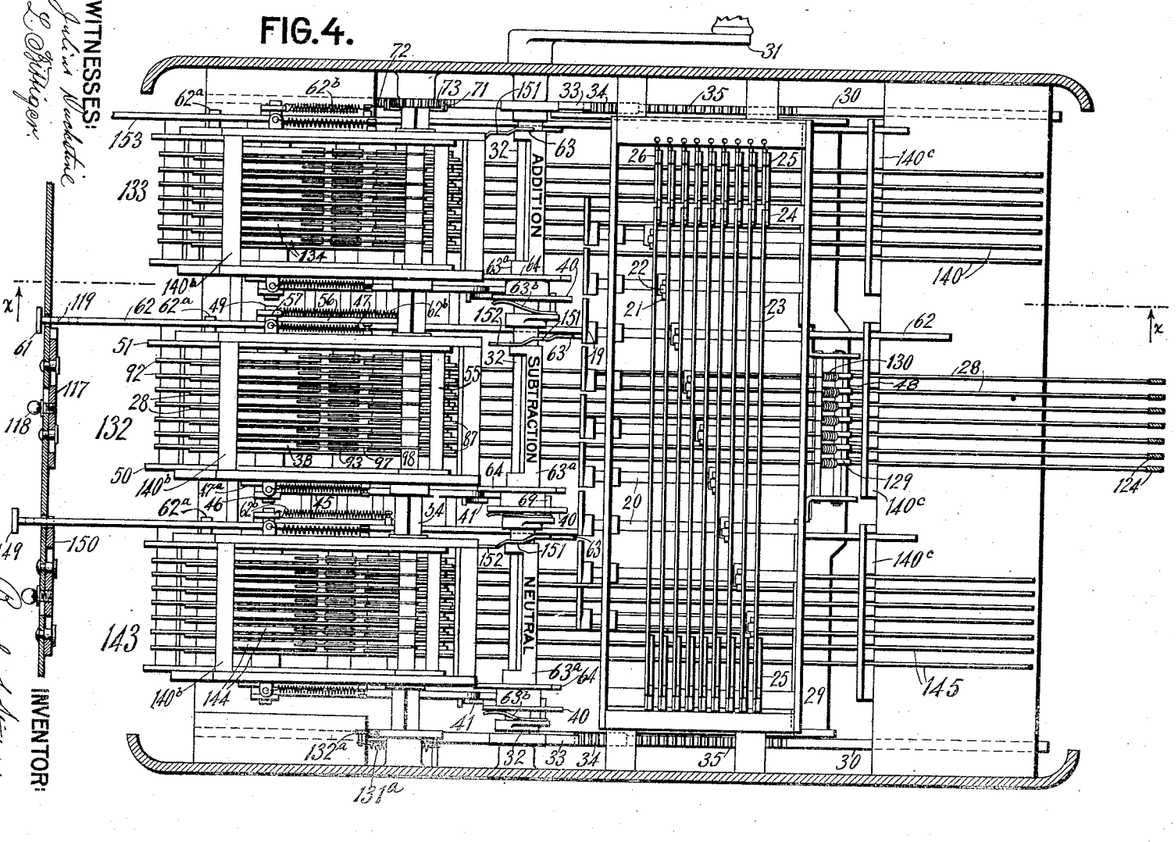
Fig. 4 is a sectional plan, showing one register in condition for addition, and one in condition for subtraction, and one silenced or neutral; and also showing the index mechanism and the bars which operate the various registers or totalizers.
Figure 11:
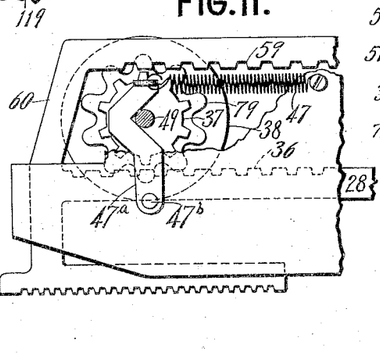
Fig. 11 is a view of the forward part of the main totalizer showing the same as automatically returned to normal position after the completion of the forward stroke of the general operator.

At Fig. 4 is seen a second adding head, totalizer or register 133, comprising a gang of number wheels 134, constructed, equipped and connected like the wheels 38 in the main totalizer (which is designated generally as 132). It will be understood that all the description as heretofore applied to the register 132, inclusive of the tens-carrying mechanism, applies also to the register 133; and Figs. 1, 11 and 12 are drawings of the register 133 as well as of the register 132. The register 133 itself is seen in sectional side elevation at Fig. 7; this register being at the left side of the machine.

Figure 5:
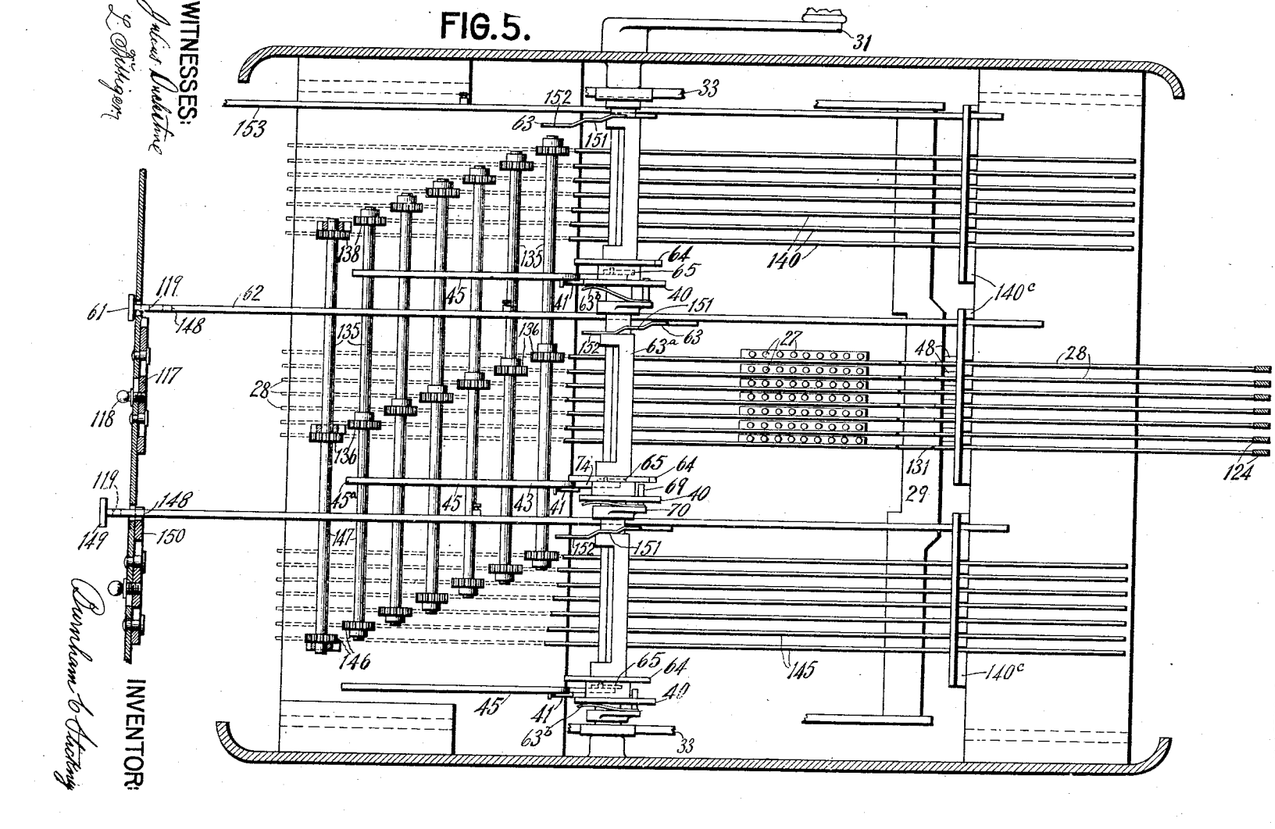
Fig. 5 is another sectional plan of the lower portion of the machine omitting the registers.
Figure 6:
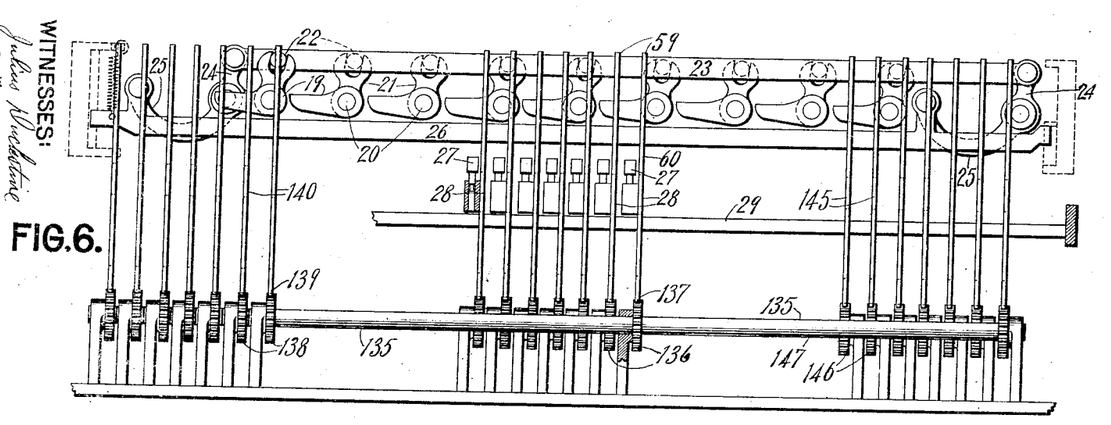
Fig. 6 is a sectional front elevation showing the forward ends of the register operating bars and cross connections between the different sets of bars whereby one set may operate the other sets.

The single indexing mechanism already described, and including the single set of index pins 27, is made to answer for both registers 132 and 133. To this end, the number wheels 134 are connected to the rack bars 28 to be driven thereby. Connection is effected by means of a series of cross shafts 135, one for each number wheel. Each shaft has a driving pinion 136 meshing with a rack 137 provided upon the bar 28, and a pinion 138 meshing with a similar rack 139, Figs. 6, 7 and 9, on bars 140, which correspond with the bars 28, and have at their forward ends racks 141 and 142 to correspond with the racks 36 and 59 on the bars 28, whereby the pinions 37 of the number wheels 134 are actuated, the same as in the register 132. It will be noted that the bars 140 are not provided with index pins 27, nor with carriage-controlled denomination-selecting devices. The cross-shafts 135 are denominational, the units rack bar 28 being connected by its own cross-shaft with the units bar 140, the tens bar 28 with the tens bar 140, and so on. The cross-shafts 135 may be placed in a row, or one behind another, Fig. 5, so that the shaft driving racks 137 may be on the same level, Fig. 3, and the racks 137, as well as the driving racks 139, may be accordingly arranged in echelon. The bars 140 may be guided in any suitable manner to prevent displacement thereof, as is the case with the bars 28. The guides may include forward guide-combs 140ª and 140ᵇ, and a rear guide comb 140ᶜ.

From the foregoing, it will be seen that whenever any number is run up on the major register 132, the same number will be run up on the sub-register 133; hence the latter may be employed for sub-total, as for instance, it may give the totals of the items on each of a series of bills, while the major totalizer 132 will give the gross sum of the items on all the bills.

In case three or more registers are required, the cross shafts 135 may be extended to the additional register or registers, and provided with suitable pinions to drive the same. As an illustration, a third register is shown at 143, Fig. 4, having number wheels 144, and being in all respects similar to registers 132 and 133. This register is operated by bars 145 similar to bars 140, and similarly connected by means of pinions 146 on extensions 147 of the cross-shafts 135; these extensions being preferably at the right of said cross-shafts; although the invention is not limited to this particular arrangement.

The pinions 146, 138 and 136 in the three sets are all arranged in echelon, and the racks 137, 139 all have the same arrangement. Thus each of the major rack bars 28 operates to drive the bars 140 and 145 of the same denomination, to operate corresponding wheels in both registers 133 and 143. Thus all three registers may be controlled by a single set of index pins 27, which are selectively set by the numeral keys of the typewriter. A single denomination-selecting mechanism 124, 126, etc., serves for all three registers, and whenever any number is carried into the register 132, it is simultaneously carried into the registers 133 and 143, whereby a variety of work may be performed.

Figure 10:
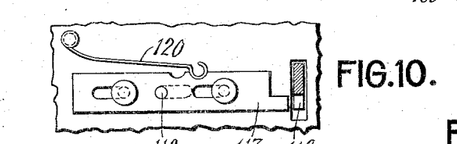
Fig. 10 is a sectional rear key in either bolt for locking a subtraction key in either subtracting or neutral position.

It will be seen at Fig. 3, that the subtraction key bar 62 has, besides the notch 119 (which coöperates with the bolt 117, Figs. 4 and 10, to hold the subtraction key in subtraction position), a second notch 148, which becomes available midway between the addition and subtraction positions of said bar 62, and at such time may be engaged by the bolt 117, to silence the major register 132 while one or both of the sub-registers 133 and 143 are active. In other words, the index pins 27 may be employed to the subtraction key 149 of the sub-register without driving the major register 132. At Fig. 4 the key 61 of the main register is pressed in to the subtraction position, where it can be detained by pressing the bolt handle 118 to the left. At the same figure, the subtraction key 149 of the sub-register 143 is shown as pressed back to its midway position, where it is held by its bolt 150, said parts 149 and 150 corresponding to parts 61 and 117. Thus the sub-register 143 is silenced or rendered neutral while the major register 132 is subtracting. It will be noticed that cam 63 on each of the subtraction shift keys 61 and 149 is provided with a neutralizing surface or portion 151, to hold the shiftable member 63ª in a position midway of the extreme positions to which it may be shifted along the main operating shaft 32, so that both of the cam disks 40 and 64 will be out of reach of the devices 41 and 65, and hence the number wheels will retain their normal positions as at Fig. 3, disengaged from their driving racks during the forward stroke of the general operator effected by the handle 31. Each cam also has a portion 152 which always holds the member 63ª at the extreme right-hand or subtracting position, as shown by the major register 132 in Fig. 4. At said figure the subtraction key 153 of the left-hand register 133 is shown in its normal position, so that said register 133 performs addition while register 132 is performing subtraction, and while register 143 is silenced or neutral.

It will be seen that any of the subtraction shift keys 61, 149 and 153 may be in either of its addition, subtraction and neutral positions while each of the other two keys is in either of its three positions. Hence any one of the three registers may either add, subtract, or remain neutral while either one or both of the remaining registers either adds, subtracts, or is silenced. By shifting all of the keys to the same position as key 149 in Fig. 4, all three registers will be silenced or remain neutral, so that they will not be disturbed during the operation of the general operator 31; or all may be made to add or to subtract. Thus a very great range of work may be done; and obviously the invention is not limited to the use of three registers, as either more or less than three may be connected up to the major driving racks by means of suitably disposed cross driving-shafts or other connections.

Referring to Fig. 16, additional dogs 126 or 127 may be provided on the typewriter carriage 7; and these dogs may be adjusted along the rack forming part of the usual tabulating mechanism illustrated at Fig. 3. The dogs may be so adjusted that each will operate the jacks or levers 124 during the writing of the corresponding number in the column, so that two columns may be written on the page, and the corresponding numbers carried into the registers. Thus may be performed a great variety of cross addition and other cross computations, since each of the registers may either add or subtract or remain neutral, while each of the other registers is either adding, subtracting, or remaining neutral.

Variations may be resorted to within the scope of the invention, and portions of the improvements may be used without others.

Having thus described my invention, I claim:

1. In a combined typewriting and computing machine, the combination of a plurality of computing heads; actuating devices for each computing head; a carriage movable step-by-step; connections operated by the carriage movement for controlling the denominational selection of the actuating devices for solely one of said computing heads; and means enabling the actuating devices for that head to control the simultaneous operation of the actuating devices for the remaining head or heads.

2. In a combined typewriting and computing machine, the combination of a plurality of computing heads; a carriage movable step by step; a single set of bars for driving solely one of said heads; indexing devices for determining the extent of such drive; means for setting said devices under control of the carriage; means for actuating said bars; and means brought into action by said bars for effecting the simultaneous drive of the remaining head or heads to the same extent as determined by the set indexing devices.

3. In a combined typewriting and computing machine, the combination of a plurality of computing heads; actuating devices for each computing head; a carriage movable step by step; connections operated by the carriage movement for controlling the denominational selection of the actuating devices for solely one of said computing heads; means for enabling the actuating devices for that head to control the simultaneous operation of the actuating devices for the remaining head or heads; and a state-control device individual to each head for enabling the same to compute either additively or subtractively.

4. In a combined typewriting and computing machine, the combination of a plurality of computing heads; actuating devices for each computing head; a carriage movable step by step; connections operated by the carriage movement for controlling the denominational selection of the actuating devices for solely one of said computing heads; means for enabling the actuating devices for that head to control the simultaneous operation of the actuating devices for the remaining head or heads; and a state-control device individual to each head for either silencing the same or causing it to compute either additively or subtractively.

5. In a combined typewriting and computing machine, the combination of numeral keys; a plurality of computing heads; a set of drivers for each head; a carriage movable step-by-step; means for positively or directly driving solely one of said sets of drivers; a single set of denomination-selecting devices, under the control of said carriage, associated with said positively-driven set of drivers; a single set of indexing devices for setting up a number to be computed, under joint control of said keys and said denomination-selecting devices; and connections between said positively-driven set of drivers and the remaining set or sets thereof, for driving said remaining set or sets equally and concurrently with and from the first-named set, whereby the same number will be carried into all of said computing heads at the same time.

6. In a combined typewriting and computing machine, the combination of numeral keys; a plurality of computing heads; a set of drivers for each head; a carriage movable step-by-step; means for directly or positively driving solely one of said sets of drivers; indexing devices for setting up a number to be computed, under joint control of said carriage and keys, and associated with said positively-driven set of drivers; and connections between each driver in said positively-driven set of drivers and the driver of like denomination in the remaining set or sets of drivers, for driving said remaining set or sets equally and concurrently with and from the first-named set, whereby the same number will be carried into all of said computing heads at the same time.

7. In a combined typewriting and computing machine, the combination of numeral keys; a plurality of computing heads; a set of drivers for each head; a carriage movable step by step; a single set of denomination-selecting devices under control of said carriage; means for positively driving solely one of said sets of drivers; indexing devices for setting up a number to be computed under joint control of said keys and denomination-selecting devices and associated with said positively-driven set of drivers; and a gear train connecting each driver in said positively-driven set with the driver of like denomination in the remaining set or sets, for driving said remaining set or sets equally and concurrently with and from the first-named set, whereby the same number will be carried into all of said computing heads at the same time, said gear trains comprising shafts disposed in a horizontal plane, and pinions mounted on said shafts and arranged in echelon.

8. In a combined typewriting and computing machine, the combination of numeral keys; a plurality of computing heads; a set of drivers for each head; a carriage movable step by step; indexing devices for setting up a number to be computed under joint control of said carriage and keys; means for positively driving solely one of said sets of drivers; a single set of selecting connections leading from said carriage to said positively-driven set of drivers; a plurality of selecting devices carried by said carriage and so arranged that each will operate all of said selecting connections during a single traverse of said carriage; and connections between said positively-driven set of drivers and the remaining set or sets thereof, for driving said remaining set or sets equally and concurrently with and from the first-named set, whereby the same number will be carried into all of said computing heads at the same time.

9. In a machine of the character specified, the combination, with a plurality of computing heads; of a set of drivers for each head, each driver of each set having a rack for driving the accordant computing wheel of the corresponding head, and also having a separate, auxiliary rack; means for directly or positively actuating solely one set of drivers; and a connection between the auxiliary rack of each driver of that set and the auxiliary rack of the driver or drivers of like denomination in the remaining set or sets, for driving the same equally and concurrently with the first-named rack, whereby the same number will be run into all of said computing heads at one and the same time.

10. In a machine of the character specified, the combination, with a plurality of computing heads; of a set of drivers for each head, each driver of each set having addition and subtraction racks for driving the accordant computing wheel of the corresponding head in one direction or the other, and also having a separate, auxiliary rack; means for effecting a preliminary relative movement between each computing head and its associated set of drivers, to determine whether the former shall be actuated by the addition racks or the subtraction racks; means for directly or positively actuating solely one set of drivers; and a connection between the auxiliary rack of each driver of that set and the auxiliary rack of the driver or drivers of like denomination in the remaining set or sets, for driving the same equally and concurrently with the first-named rack, whereby the same number will be run into all of said computing heads at one and the same time.

11. In a machine of the character specified, the combination, with a plurality of computing heads; of a set of drivers for each head, each driver of each set having a rack for driving the accordant computing wheel of the corresponding head, and also having a separate, auxiliary rack arranged beneath and parallel with the first-named rack; means for directly or positively actuating solely one set of drivers; and a connection between the auxiliary rack of each driver of that set and the auxiliary rack of the driver or drivers of like denomination in the remaining set or sets, for driving the same equally and concurrently with the first-named rack, whereby the same number will be run into all of said computing heads at one and the same time.

12. In a machine of the character specified, the combination, with a plurality of computing heads; of a set of drivers for each head, each driver of each set having spaced, parallel addition and subtraction racks for driving the accordant computing wheel of the corresponding head in one direction or the other, and also having a separate, auxiliary rack arranged beneath and parallel with the first-named racks; means for effecting a preliminary relative movement between each computing head and its asociated set of drivers, to determine whether the former shall be actuated by the addition racks or the subtraction racks; means for directly or positively actuating solely one set of drivers; and a connection between the auxiliary rack of each driver of that set and the auxiliary rack of the driver or drivers of like denomination in the remaining set or sets, for driving the same equally and concurrently with the first-named rack, whereby the same number will be run into all of said computing heads at one and the same time.

BURNHAM C. STICKNEY.

Witnesses:
F. E. ALEXANDER,
GEO. W. NAYLOR.